United States Patent
Hinn

(10) Patent No.: US 8,018,486 B2
(45) Date of Patent: Sep. 13, 2011

(54) CAMERA CARRIAGE

(75) Inventor: Albert K. Hinn, Ebersbach (DE)

(73) Assignee: Rico Gesellschaft fur Mikoroelektronik mbH, Kempten (DE)

( * ) Notice: Subject to any disclaimer, the term of this patent is extended or adjusted under 35 U.S.C. 154(b) by 1382 days.

(21) Appl. No.: 10/561,744

(22) PCT Filed: Jun. 22, 2004

(86) PCT No.: PCT/EP2004/006780
§ 371 (c)(1),
(2), (4) Date: Mar. 20, 2006

(87) PCT Pub. No.: WO2004/113861
PCT Pub. Date: Dec. 29, 2004

(65) Prior Publication Data
US 2006/0164512 A1    Jul. 27, 2006

(30) Foreign Application Priority Data
Jun. 25, 2003    (DE) .............. 203 09 864 U

(51) Int. Cl.
*H04N 7/18*    (2006.01)
(52) U.S. Cl. .......................... 348/84; 348/85
(58) Field of Classification Search ............ 348/84, 348/85
See application file for complete search history.

(56) References Cited

U.S. PATENT DOCUMENTS

| | | | | |
|---|---|---|---|---|
| 4,560,931 A | * | 12/1985 | Murakami et al. | 324/220 |
| 4,974,168 A | * | 11/1990 | Marx | 702/187 |
| 6,621,516 B1 | * | 9/2003 | Wasson et al. | 348/84 |
| 7,073,979 B2 | * | 7/2006 | McGrew et al. | 405/184.2 |

FOREIGN PATENT DOCUMENTS

| | | | |
|---|---|---|---|
| DE | 3522149 | | 6/1985 |
| DE | 4206609 | | 3/1992 |
| EP | 0623814 | | 2/1994 |
| EP | 1022553 | | 7/2000 |
| GB | 2342419 A | * | 4/2000 |

* cited by examiner

*Primary Examiner* — Sinh Tran
*Assistant Examiner* — Selam Gebriel
(74) *Attorney, Agent, or Firm* — Notaro, Michalos & Zaccaria P.C.

(57) ABSTRACT

The invention relates to a dolly, comprising a running gear and a lighting system, for inspecting pipes. At least two cameras (10, 11) are disposed in a common housing (4) and at least one camera is provided with means for changing the angle of view. The aim of the invention is to provide a dolly which can be used for the most varied applications and a method for inspecting pipe sections using a dolly and/or for representing the result of inspection. For this purpose, the means (7, 9, 2) are configured as a cardanic suspension of the housing (4) having motors for swiveling and/or rotating the housing (4) about at least one axis (5), especially about an axis that is orthogonal in relation to the longitudinal axis (6) of the dolly.

7 Claims, 4 Drawing Sheets

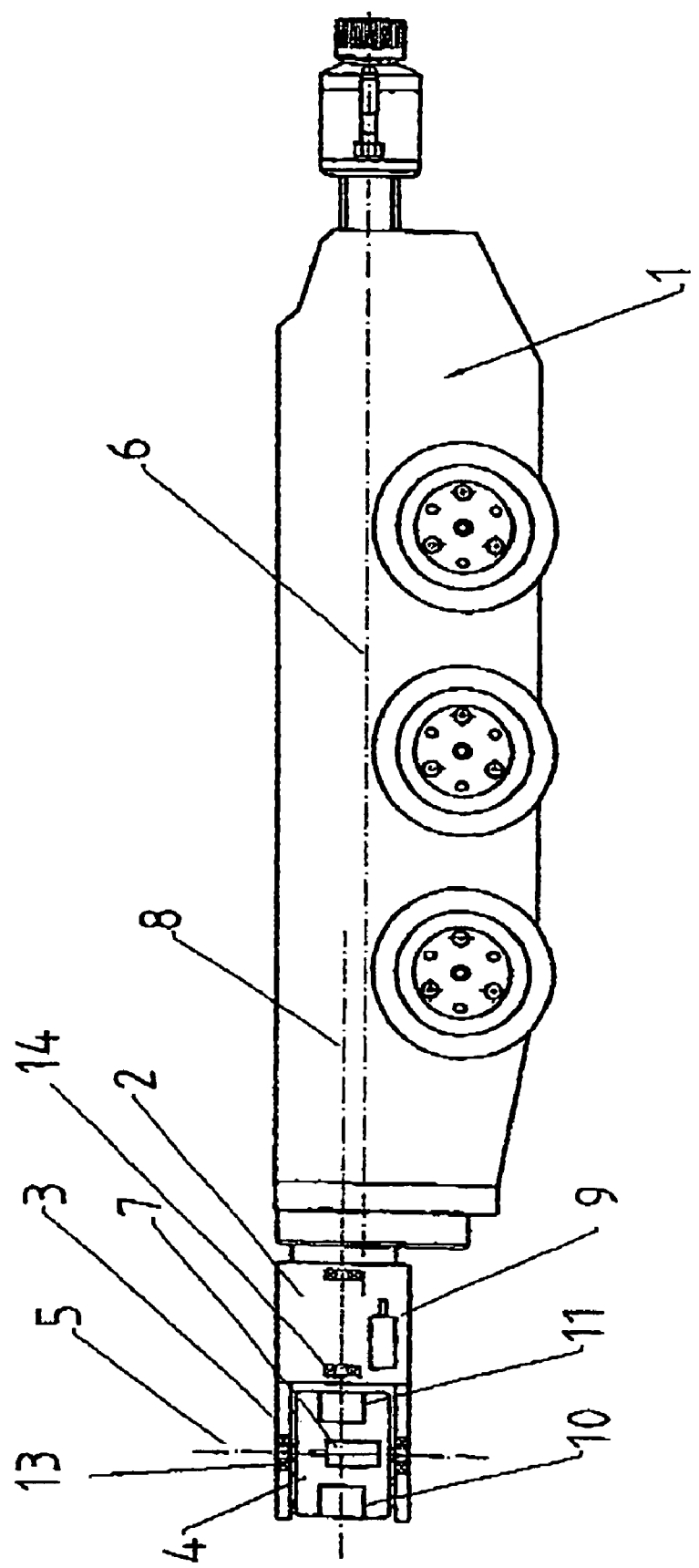

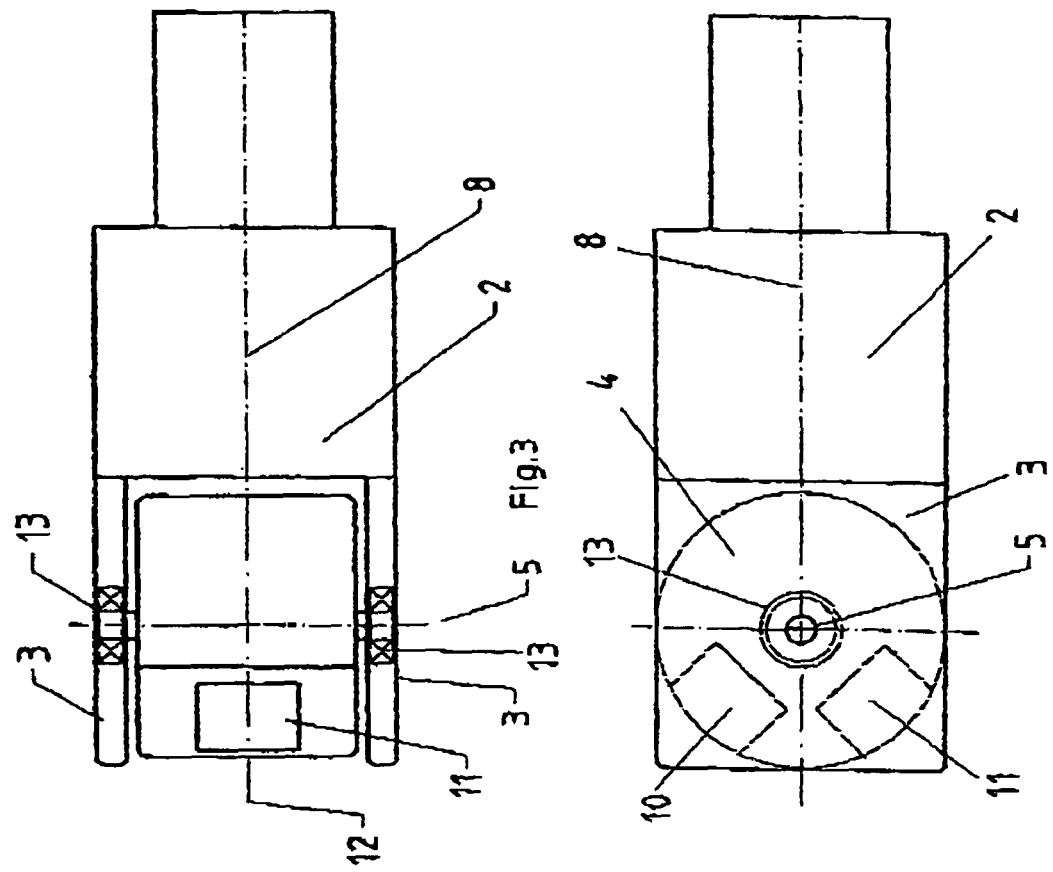

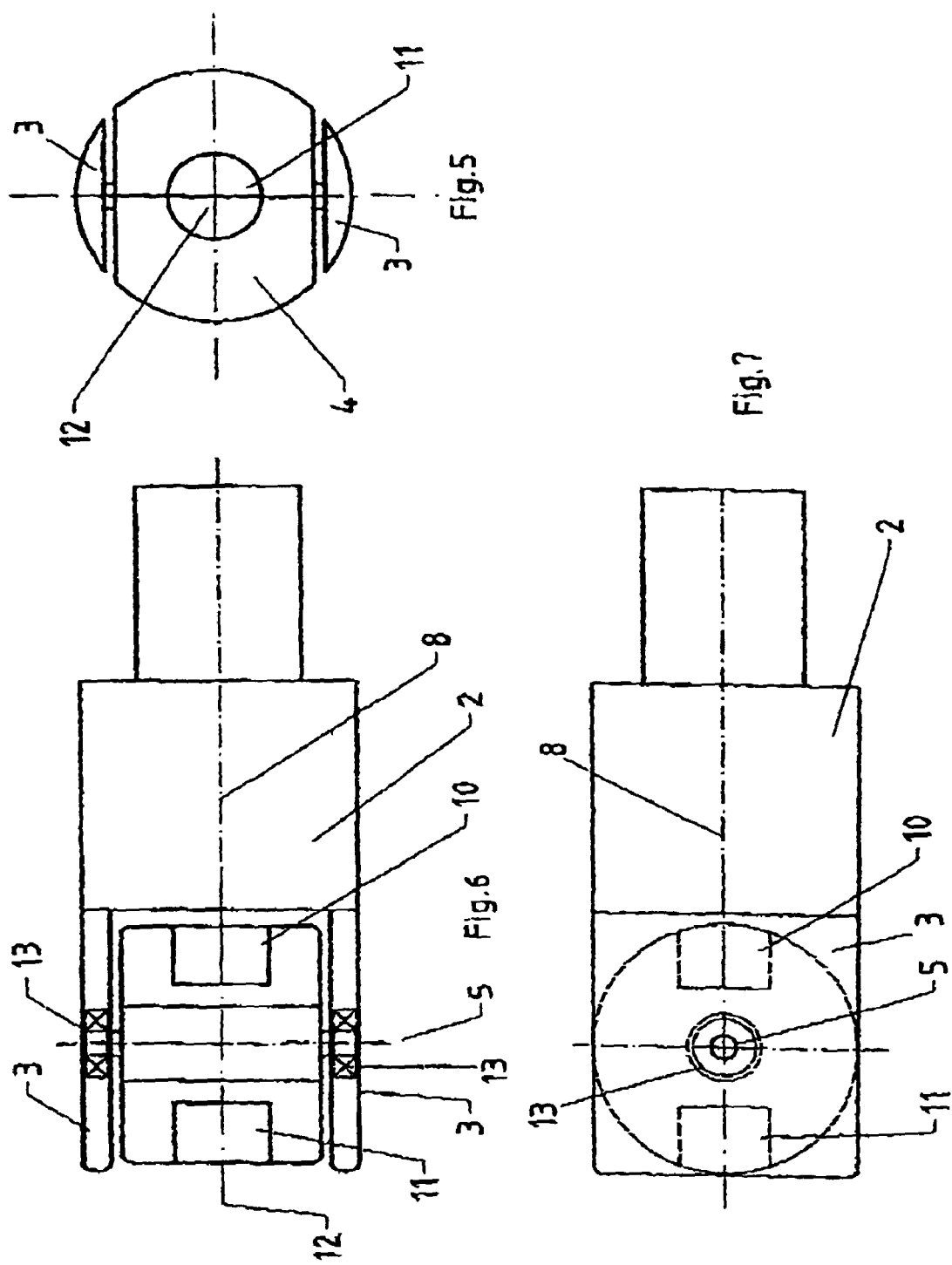

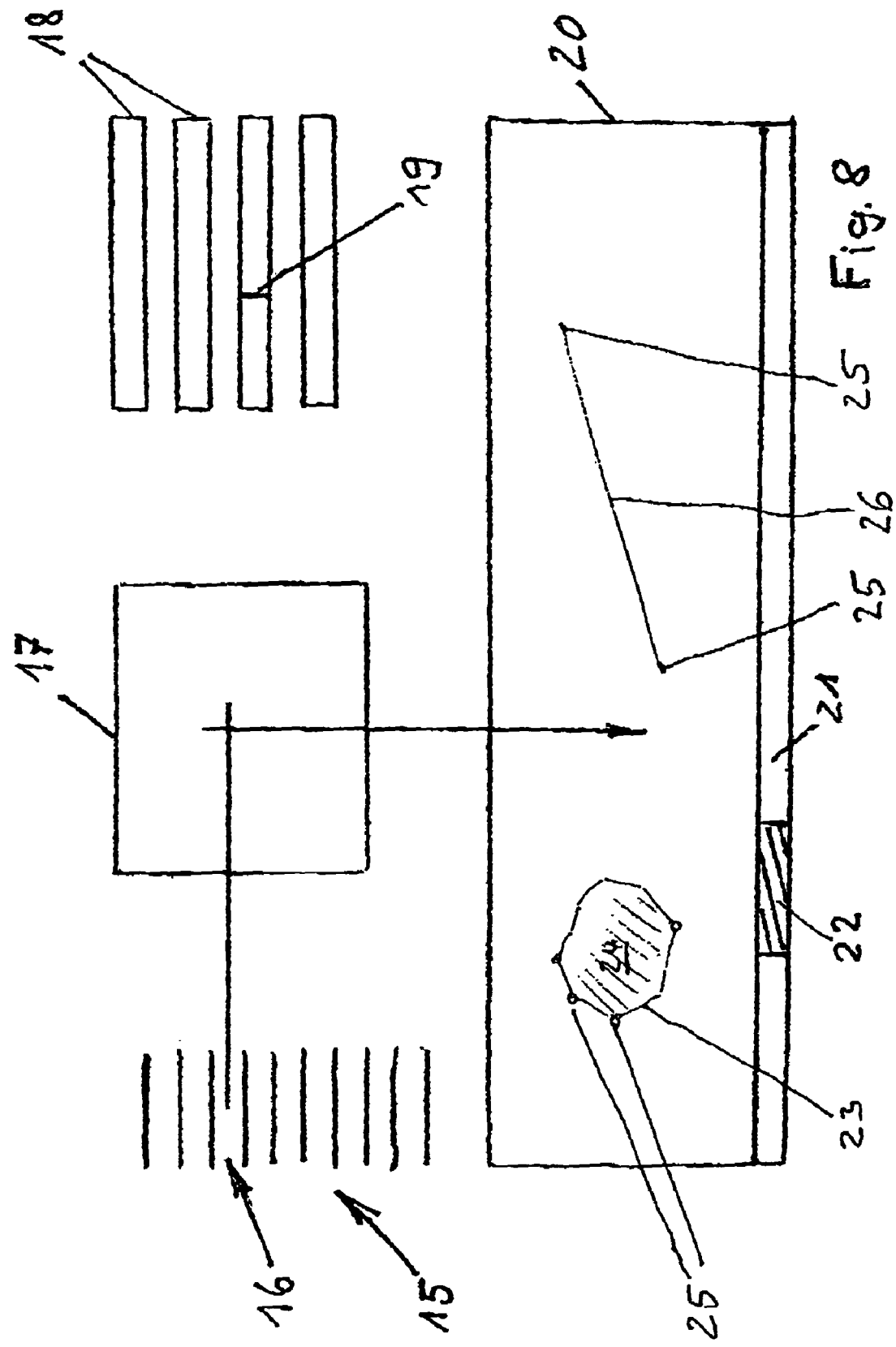

CAMERA CARRIAGE

FIELD AND BACKGROUND OF THE INVENTION

The invention relates to a carriage with a running gear and lighting equipment to inspect pipe lines. At least two cameras are disposed in a common housing and at least one camera comprises means for changing the angle of view. The invention further relates to a method for inspecting pipe sections and/or displaying the findings of the inspection by means of a carriage is provided.

Such a carriage is disclosed in DE 35 22 149. This documents shows a device for the remote inspection of pipe lines. In this device two cameras are disposed in a common housing and optical means, i.e. a mirror or a prism, is provided for rotating the housing in order to rotate the optical means about an axis parallel to the axis of the carriage. In this way it is possible for one camera to view into the pipe and the other camera to check the circumference of the pipe.

Of disadvantage in this device is in particular that the optic axes of the cameras are offset. This changes the optical distance of the cameras during the swivelling of the mirror.

A further carriage is disclosed, for example, in EP 1 022 553 A2. Said document describes a camera carriage for inspecting channel pipes comprising two electronic cameras, of which the one is located at the front end of the carriage and the other camera at the back end of the carriage. Both cameras are equipped with a wide-angle lens acquiring a hemispheric space. The digital image signals are stored and can be optically analyzed at a later time.

This known carriage has the disadvantage that it is not possible to inspect pipe branchings with it, since the fisheye lenses are fixedly connected with the carriage. Moreover, the detailed inspection of pipe coupling sleeves is not possible with this known carriage.

The complicated cable routing is a further disadvantage. The energy supply and data cable terminate conventionally in the rearward region of the carriage. However, this region is occupied by the additional optical system of the camera. In order to be able to maintain contact with the carriage, the cables must be routed around the back fisheye optics.

In addition, EP 0 623 814 A2 describes a camera housing swivellable or rotatable about two axes orthogonal with respect to each other.

Lastly a device for inspecting pipes is disclosed in DE 42 06 609 A1, which utilizes a thermal imaging camera.

SUMMARY OF THE INVENTION

The invention therefore addresses the problem of proposing a carriage which can be employed for diverse job areas and a method for inspecting pipe sections by means of a carriage and/or displaying inspection findings.

According to the invention this problem is resolved thereby that the means is formed as a gimballed bearing of the housing with motors for swivelling and/or rotating the housing about at least one axis located, in particular, orthogonally with respect to the longitudinal axis of the carriage. For example, cameras with different objective lenses or recording technologies can be employed. By swivelling or rotating the housing specific regions of the pipe can be inspected more precisely. However, it is also conceivable to carry out an inspection of the piping with a first camera when advancing forward into the pipe and, when retracting the carriage, perform the inspection with a second camera. As the means for swivelling and/or rotating the housing, an electric motor can, for example, be provided. If the housing is disposed, for example, in an articulated fork, the electric motor can be located either within one or both arms of the articulated forks or in the housing itself. The data and energy transfer from the housing to the carriage takes place for example via sliding contacts. It is especially advantageous if the housing can be swivelled about an axis orthogonal with respect to the longitudinal axis of the carriage. This permits the inspection in particular of pipe connections branching off perpendicularly. Swivelling the desired camera into the straight-ahead position is also readily possible.

A further development of the invention advantageously provides that additional means are provided for swivelling and/or rotating the housing about a further axis located, in particular, parallel to the longitudinal axis of the carriage and orthogonally to the first axis. To the extent parallelism of axes is discussed here, it is understood that it also includes the special case in which the axes are congruent. Due to this advantageous embodiment it is possible to inspect every position of the pipe precisely. For the realization, on the carriage front said articulated fork is disposed, for example, within which the housing is disposed rotatably about an axis. The entire articulated fork can be rotated about its longitudinal axis by means of an electric motor on or in the carriage. Through this constructional measure it is now possible to inspect for example a pipe coupling sleeve over its entire circumference through the corresponding rotation of the articulated fork. Accordingly, for example with a different camera, specifically provided for this purpose, one or more exposures of the entire pipe can be made.

An especially advantageous embodiment of the invention provides that the camera optics of the second camera are oriented in the direction opposite to the optics of the first camera.

It becomes thereby possible to move the particular desired camera into the straight-ahead position by rotating the housing by 180 degrees.

To facilitate stringing the different exposures together by means of image processing software, it is advantageously provided that the two oppositely directed cameras are located on the same optic axis.

For many applications, in particular for electronic image processing and editing, it is necessary to obtain hemispheric exposures of the pipe. This is achieved in particular thereby that one camera is equipped with a corresponding wide-angle lens, in particular a fisheye lens. In this case the other camera is equipped, for example, with a conventional optical system. It is hereby possible that during an inspection traversal, for one, hemispheric exposures can be taken and, for another, nevertheless specific regions can be inspected by means of a conventional inspection optical system. For example, when moving the carriage into the pipe lines, all coupling sleeves can be checked circumferentially. Upon reaching a specific position, the camera with the wide-angle lens is subsequently driven into a straight-ahead position such that, when the carriage is driven out, wide-angle exposures of the pipe to be inspected can be taken. It is also possible to take for example wide-angle lens exposures of pipe branchings if the housing is provided with two swivel or rotation axes.

Automatic or user-controlled detailed exposures through variable zooming can advantageously be made possible if at least one camera is equipped with a zoom lens acquiring a limited observation region in great detail and high resolution.

According to a further development of the invention it may be of advantage for inspecting leakages that at least one camera is a thermal imaging camera. In addition, one camera can be provided for example with a wide-angle lens and/or a conventional lens.

The problem addressing the method is resolved in a method for inspecting pipe sections and/or for displaying an inspection result by means of a carriage thereby that, in addition to the documentation of the inspection of details, an exposure of a development of the circumference of the inspected pipe section is made.

According to the invention, in addition to the documentation of damage to a pipe, the current status of the pipe can also be seamlessly acquired and permanently stored on data media or paper. During the restoration or monitoring of pipe sections, not only the isolated or localized damage is of significance, but rather also the documentation that no further damage exists. The development of the circumference provides such a seamless image. Moreover, the detail image permits the precise diagnosis of the damage.

The embodiment of the method provides that the inspection of details takes place separately in time from the exposure of the development. This permits advantageously decreasing in particular the bandwidth necessary for the data transmission. For example, the details can be inspected while die carriage is driven into the pipe. For this purpose, the camera with the higher resolution and greater magnification is utilized, which subsequently can scan the pipe in all directions due to its gimballed suspension. Before the return travel the optic axis of the other camera is swivelled parallel to the axis of the carriage and, during the return travel, the entire pipe circumference is scanned and recorded by means of suitable optics, for example by means of a fisheye lens.

The capability is therein given of utilizing of the digitized image of the fisheye lens only one or several annular scan lines and to combine these by means of a computer, preferably in real time with the development of the circumference of the inspected pipe section. As a function of the frequency of the images supplied by the camera, the so-called scan rate, and of the travel speed of the carriage the number of scan lines can be adapted by calculation. The inventive method provides for this purpose that the exposure of the development takes place during one traversal through the pipe section to be inspected, preferably in one direction and preferably at constant speed. There is, for example, the further capability of joining the images into one development by means of known software.

This software, for example Photostich, joins images on the basis of similar pixels.

The analysis of the inspection results is especially facilitated if an automatic assignment of one or several of the inspected details to a locus of the developed circumference takes place. The damage site with its detailed documentation can thereby be brought permanently into a unique relationship with its precise position in the inspected pipe section. This takes place through the appropriate software-aided linkage of the position coordinates with the obtained image material. The position or the particular location of the carriage can be determined for example by a GPS receiver travelling along or by measuring the reeled out length of cable in connection with a reference point.

Further advantageous embodiments of the method are described.

BRIEF DESCRIPTION OF THE DRAWINGS

The drawing serves for a better understanding of the invention. Therein depict:

FIG. 1 a schematic illustration of the carriage,

FIG. 2 to 4 one possible disposition of the camera in the housing,

FIG. 5 to 7 a further possible disposition of the camera in the housing, and

FIG. 8 an illustration of a monitor image in schematic form.

DESCRIPTION OF THE PREFERRED EMBODIMENTS

FIG. 1 depicts a carriage 1 with running gear and lighting equipment for inspecting pipelines. The carriage is connected with the environment outside of the pipe by means of data and energy supply cables. These are wound onto one or several cable drums outside the pipe and can be unwound according to the travel depth. It is understood that it is also conceivable to provide the carriage with an energy supply system, in particular a battery or an accumulator. For the transmission of control and data signals, in this case, corresponding transmitting and/or receiving equipment must be provided.

At the front face of the carriage an articulated fork 2 is provided. Between the two arms 3 of the articulated fork 2 a rotatable housing 4 is provided. In this embodiment example the housing is pivoted about an axis 5 between the arms 3. The axis 5 is orthogonal to the longitudinal axis 6 of the vehicle.

An electric motor 7 is disposed within the housing 4 as a means for swivelling housing 4 about axis 5.

The articulated fork 2 is furthermore supported rotatable about an axis 8 which corresponds to the longitudinal axis of the articulated fork 2. For this purpose an electric motor 9 is provided within the articulated fork 2. It is understood that the electric motor 9 can also be located within the carriage 1.

The housing 4 is thus disposed such that it is rotatable about two axes 5, 8.

Within the housing 4 two cameras 10, 11 are located. In this embodiment example two different cameras are involved. Camera 10 has an angle of aperture of maximally 46 degrees and is equipped with a lens with ten-fold optical zoom and a focal length from 4.2 to 42 mm. The image sensor is, for example, a high resolution CCD sensor.

Camera 11 is a camera with fisheye lens.

Hereby exposures of the hemispheric space can be taken by swivelling the housing about one or both axes, the particular required camera can be moved into the desired position, in particular into a straight-ahead position. The straight-ahead position is parallel to the longitudinal axis 6 of the vehicle. In the depicted embodiment example a continuous rotation of the housing by 360 degrees in each instance about each axis 5, 8 is possible. However, a disposition is also conceivable in which the swivel axis 5 only makes limited swivel angles possible determined by stops. The cameras 10 and 11 are in this case so disposed in housing 4 that each of the two cameras can be positioned in the straight-ahead position parallel to the longitudinal axis 6 of the vehicle. For the energy and data transfer are herein utilized, not shown, slide rings.

FIGS. 2 to 4 depict a possible disposition of the cameras 10, 11 in housing 4. In FIGS. 2 to 4 the two cameras are arranged at an angle of 45 degrees with respect to one another. By swivelling housing 4 about axis 5 the particular required camera 10, 11 can be driven into a straight-ahead position. In FIGS. 3 and 4 the disposition of the axes 5, 8 with respect to one another is depicted. Axis 8 is parallel to the longitudinal axis of the vehicle, whereas axis 5 is orthogonal to axis 8.

In FIGS. 5 to 7 a different advantageous disposition of two cameras 10, 11 in housing 4 is shown. Camera 10 is oriented in the direction opposite to the camera optics of camera 11.

Both cameras 10, 11 are disposed on the same optic axis 12, which in FIG. 6 coincides with the rotational axis 8.

It is understood that it is also conceivable that the housing 4 is not supported rotatably between two arms 3, but rather that only one arm is provided with which the housing 4 is rotatably connected.

FIG. 8 shows in the form of a schematic monitor image 5 that, due to the inventive method, a highly descriptive convenient display of the inspection result is possible. To the individual damage images, which can be available, documented in detail, as files, names can be assigned, which in the form of a list 15 can be displayed on the monitor. As soon as an element 16 of the list 15 is indicated, in a detail image region 17 the exposed damage image is displayed in detailed representation. For the orientation of the site of the pipe line course at which the diagnosed damage is located, serves a relatively small depiction of the circumference development of the pipe line, shown in individual sections 18. The damage site of the displayed details is immediately recognizable by a noticeable indicator 19. For the sake of completeness, the developed image of the pipe circumference is also shown enlarged as development detail 20.

It is also possible to search through the image data by means of a scoll bar 21. By shifting the slide indicator 22, the indicator 19 is also shifted in real time through the sections 18, due to the software-aided linkage of the image data, and the elements 16 of list 15 are also highlighted accordingly and displayed in the detail region 17.

The display of the development details 20 preferably takes place in the Cartesian system of coordinates, the abscissa representing the location in the axial direction of the pipe and the ordinate the circumferential angle of the instantaneous pipe diameter. However, a display in other systems of coordinates is also possible.

The display in the Cartesian system of coordinates offers the advantage that it also permits descriptically a quantitative damage documentation. For example after opening a list with software tools, a so-called tool bar, it is possible with the aid of the cursor to drag a polygon 23 around a damage region and its area 24 can be determined automatically and be displayed.

Similarly, by setting two points 25 after starting an appropriate software tool, the distance of the points 25 or the length of the line segment 26 can be displayed.

For the display of the details, the developed pipe circumference is advantageously cut at 12 o'clock, thus at the top. The precise position of this cut can especially advantageously be automatically specified through a gravity sensor. The base of a channel in this case is located in the horizontal image center.

Due to the inspection method an especially descriptive display and a rapid analysis of the extensive data material is possible in this way.

LIST OF REFERENCE NUMBERS 1 carriage
2 articulated fork
3 arms
4 housing
5 swivel axis
6 longitudinal axis of the vehicle
7 electric motor
8 axis of rotation
9 electric motor
10 camera
11 camera
12 optic axis
13 articulation for swivelling the camera head
14 swivel joint for the rotation of the camera head
15 list
16 element
17 detail region
18 section
19 indicator
20 development detail
21 scroll bar
22 slide indicator
23 polygon
24 area
25 points
26 line segment

The invention claimed is:

1. A camera carriage (1) with a running gear and lighting equipment for inspecting piping, the camera carriage (1) comprising: at least two cameras (10, 11) disposed in a common housing (4); at least one of said cameras (10, 11) comprising means (2, 7, 9) for changing a viewing angle of said cameras (10, 11) to bring each camera (10, 11) into a respective operative state for each camera (10, 11); said means (2, 7, 9) comprising gimballed bearings of the housing (4) with motors for swivelling and/or rotating the housing (4) about at least one first axis (5) that is orthogonal to a longitudinal axis (6) of the carriage; and the two cameras (10, 11) being located on the same optic axis (12) and sharing a single line of sight in the respective operative states of the cameras.

2. A camera carriage as claimed in claim 1, including additional means (9, 7, 2) for swivelling and/or rotating the housing (4) about a second axis (8), parallel to the longitudinal axis (6) of the carriage and orthogonal to the first axis (5).

3. A camera carriage as claimed in claim 1, including camera optics of the other camera (10) oriented in the direction opposite to the camera optics of the at least one camera (11).

4. A camera carriage as claimed in claim 1, wherein the two cameras (10, 11) are disposed in their optic axes (12) at a specified non-zero angle with respect to one another.

5. A camera carriage as claimed in claim 1, wherein at least one camera (10, 11) is equipped with a wide-angle fisheye lens, for acquiring an image of a hemispheric space.

6. A camera carriage as claimed in claim 1, wherein at least one camera (10, 11) is equipped with a zoom lens acquiring a limited observation region in great detail and in high resolution.

7. A camera carriage as claimed in claim 1, wherein at least one camera (10, 11) is a thermal imaging camera.

* * * * *